(12) United States Patent
Fuwa

(10) Patent No.: US 7,647,159 B2
(45) Date of Patent: Jan. 12, 2010

(54) CONTROL METHOD AND CONTROL APPARATUS FOR INTERNAL COMBUSTION ENGINE

(75) Inventor: Naohide Fuwa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 364 days.

(21) Appl. No.: 11/883,787

(22) PCT Filed: Jan. 23, 2006

(86) PCT No.: PCT/JP2006/301378

§ 371 (c)(1),
(2), (4) Date: Aug. 7, 2007

(87) PCT Pub. No.: WO2006/085445

PCT Pub. Date: Aug. 17, 2006

(65) Prior Publication Data
US 2009/0299603 A1  Dec. 3, 2009

(30) Foreign Application Priority Data
Feb. 8, 2005 (JP) ............................. 2005-032031

(51) Int. Cl.
*F02D 43/00* (2006.01)
*F01L 1/34* (2006.01)

(52) U.S. Cl. .................... 701/103; 123/403; 123/90.17

(58) Field of Classification Search ......... 701/102–105, 701/110, 115; 123/403, 348, 347, 90.15–90.18
See application file for complete search history.

(56) References Cited

U.S. PATENT DOCUMENTS

| | | | | |
|---|---|---|---|---|
| 5,482,012 A | * | 1/1996 | Yoshioka ................. | 123/90.15 |
| 5,497,737 A | * | 3/1996 | Nakamura ................ | 123/90.15 |
| 6,425,357 B2 | * | 7/2002 | Shimizu et al. .......... | 123/90.16 |
| 6,513,467 B2 | * | 2/2003 | Nohara et al. ........... | 123/90.15 |
| 6,564,763 B2 | * | 5/2003 | Shiraishi et al. .......... | 123/90.15 |
| 6,679,206 B2 | * | 1/2004 | Takagi .................... | 123/90.15 |
| 6,691,022 B2 | * | 2/2004 | Takemura et al. ............ | 701/109 |
| 6,691,506 B2 | * | 2/2004 | Shimizu ...................... | 60/284 |
| 6,705,257 B2 | * | 3/2004 | Shimizu ................. | 123/90.15 |
| 6,999,864 B2 | * | 2/2006 | Iizuka et al. ................ | 701/103 |

(Continued)

FOREIGN PATENT DOCUMENTS

EP  1 143 119 A2  10/2001

(Continued)

*Primary Examiner*—Stephen K Cronin
*Assistant Examiner*—Johnny H Hoang
(74) *Attorney, Agent, or Firm*—Oliff & Berridge, PLC

(57) ABSTRACT

When the engine load is in a high-load zone, an absolute value control is executed, wherein the actual values of valve timings of an intake valve and an exhaust valve and a valve duration of the intake valve are controlled to coincide with respective target values set based on the operating state of an internal combustion engine. When the engine load is in a low-load zone, a relative value control is executed, wherein an actual value of a valve overlap amount of the intake valve and the exhaust valve is controlled to coincide with a target valve overlap amount obtained based on the target values. Therefore, a control method for the internal combustion engine that is appropriate for the operating state of the engine when the operating state of the engine is in transition is obtained.

14 Claims, 5 Drawing Sheets

U.S. PATENT DOCUMENTS

| | | |
|---|---|---|
| 7,011,054 B2 * | 3/2006 | Hirowatari et al. ....... 123/90.15 |
| 2001/0023674 A1 | 9/2001 | Shimizu et al. |
| 2002/0023604 A1 | 2/2002 | Nohara et al. |
| 2003/0196619 A1 | 10/2003 | Takagi |
| 2005/0268871 A1 | 12/2005 | Hirowatari et al. |

FOREIGN PATENT DOCUMENTS

| | | |
|---|---|---|
| JP | A-2001-263015 | 9/2001 |
| JP | A-2003-106176 | 4/2003 |
| JP | A-2003-184586 | 7/2003 |
| JP | A-2003-314308 | 11/2003 |
| JP | A-2004-52677 | 2/2004 |
| JP | A-2005-30221 | 2/2005 |
| WO | WO 2004/109079 A1 | 12/2004 |

* cited by examiner

CONTROL METHOD AND CONTROL APPARATUS FOR INTERNAL COMBUSTION ENGINE

FIELD OF THE INVENTION

The present invention relates to a control method for an internal combustion engine that controls the valve timing of intake valves and exhaust valves, and the valve duration of the intake valves based on the engine operating state, and more specifically to a control method for the internal combustion engine when the operating state of the engine is in transition. The present invention further relates to a control apparatus for an internal combustion engine.

BACKGROUND OF THE INVENTION

A typical internal combustion engine for a vehicle includes a variable valve timing mechanism for changing the valve timing of intake valves and exhaust valves based on the engine operating state to improve the engine output and the exhaust characteristics. The mechanism changes the valve timing of the intake valves and the exhaust valves by changing the relative rotational angle of a camshaft with respect to the crankshaft of the internal combustion engine.

An variable valve duration mechanism has been proposed that changes the valve duration of the intake valves (the crank angle from when each intake valve is opened until when the intake valve is closed) in accordance with the engine operating state (for example, Japanese Laid-Open Patent Publication No. 2001-263015). With the internal combustion engine equipped with the mechanism, the amount of air drawn into engine combustion chambers is adjusted by changing the valve duration of the intake valves. Furthermore, adjusting the intake air amount by changing the valve duration of the intake valves permits the opening degree of an intake throttle valve to be set as large as possible, thus reducing the pumping loss.

Since the valve timing of the intake/exhaust valves and the valve duration of the intake valves are controlled in accordance with the engine operating state, the valve overlap amount of the intake/exhaust valves is appropriately set in accordance with the engine operating state. Since the internal EGR amount, the pumping loss, or the engine combustion state changes significantly as the valve overlap amount changes, the valve overlap amount is desirably controlled appropriately when operating the engine.

There is a predetermined delay in the response of the operation of the variable valve timing mechanism and the variable valve duration mechanism. Therefore, a temporary divergence occurs between the control target values and the actual values of the mechanisms. Therefore, when the control target values are changed in accordance with the change of the engine operating state during a steady operating state where the control target values and the actual values of the mechanisms coincide each other, the operating state of the internal combustion engine shifts into a transition state where the control target values and the actual values of the mechanisms diverge. Then, the operating state of the internal combustion engine shifts into the steady operating state again after a predetermined period has elapsed. When the valve timing of the intake/exhaust valves and the valve duration of the intake valves are independently controlled, the following problems occur when the operating state of the engine is in transition.

That is, when the internal combustion engine shifts from the steady operating state to the transition operating state, the valve timing of the intake/exhaust valves and the valve duration of the intake valves are controlled such that the control target values coincide with the actual values. However, at this time, the valve overlap amount may be controlled to an amount inappropriate for the engine operating state in transition. More specifically, as shown in FIGS. 7A to 7C, when, for example, the engine operating state shifts from a state where the valve overlap amount is desirably set as small as possible (FIG. 7A) to a different state (FIG. 7C), if the valve timing of the intake/exhaust valves and the valve duration of the intake valves are controlled accordingly, the valve overlap amount may be temporarily increased (FIG. 7B). When the valve overlap amount is unexpectedly increased, an internal EGR is excessively performed, leading to deterioration of the engine combustion. As described above, when the operating state of the engine is in transition, the valve overlap amount may be controlled to an amount inappropriate for the engine operating state on each occasion. Therefore, although it is temporary, there is an adverse effect on the engine operation.

To avoid adversely affecting the engine operation, for example, the valve timing of the intake/exhaust valves and the valve duration of the intake valves may be controlled such that the valve overlap amount will not be inappropriate when the operating state of the engine is in transition. However, when such a method is simply employed, although the valve overlap amount is appropriately controlled, the divergence between the actual values and the control target values of the valve timing of the intake/exhaust valves and the valve duration of the intake valves is not promptly eliminated.

SUMMARY OF THE INVENTION

Accordingly, it is an objective of the present invention to provide a control method for an internal combustion engine that is used to control the valve timing of intake/exhaust valves and the valve duration of the intake valves with an approach appropriate for the operating state of the internal combustion engine when the operating state of the engine is in transition. The present invention further provides a control apparatus for an internal combustion engine.

To achieve the above-mentioned objective, the present invention provides a control method for an internal combustion engine that controls the valve timings of an intake valve and an exhaust valve and valve duration of the intake valve based on the operating state of the internal combustion engine. The control method includes executing an absolute value control, wherein, when the engine load is in a high-load zone, the actual values of the valve timings of the intake valve and the exhaust valve and the valve duration of the intake valve are controlled to coincide with respective target values set based on the operating state of the internal combustion engine. The control method further includes executing a relative value control, wherein, when the engine load is in a low-load zone, the actual value of the valve overlap amount of the intake valve and the exhaust valve is controlled to coincide with a target valve overlap amount obtained based on the target values.

Further, the present invention provides a control apparatus for an internal combustion engine that controls the valve timings of an intake valve and an exhaust valve and the valve duration of the intake valve based on the operating state of the internal combustion engine. The apparatus includes a first control unit, which executes an absolute value control, wherein, when the engine load is in a high-load zone, the actual values of the valve timings of the intake valve and the exhaust valve and the valve duration of the intake valve are controlled to coincide with respective target values set based on the operating state of the internal combustion engine. A second control unit executes a relative value control, wherein, when the engine load is in a low-load zone, the actual value of the valve overlap amount of the intake valve and the exhaust valve is controlled to coincide with a target valve overlap amount obtained based on the target values.

DETAILED DESCRIPTION OF THE PREFERRED EMBODIMENTS

One embodiment of the present invention will now be described.

Figure 1:
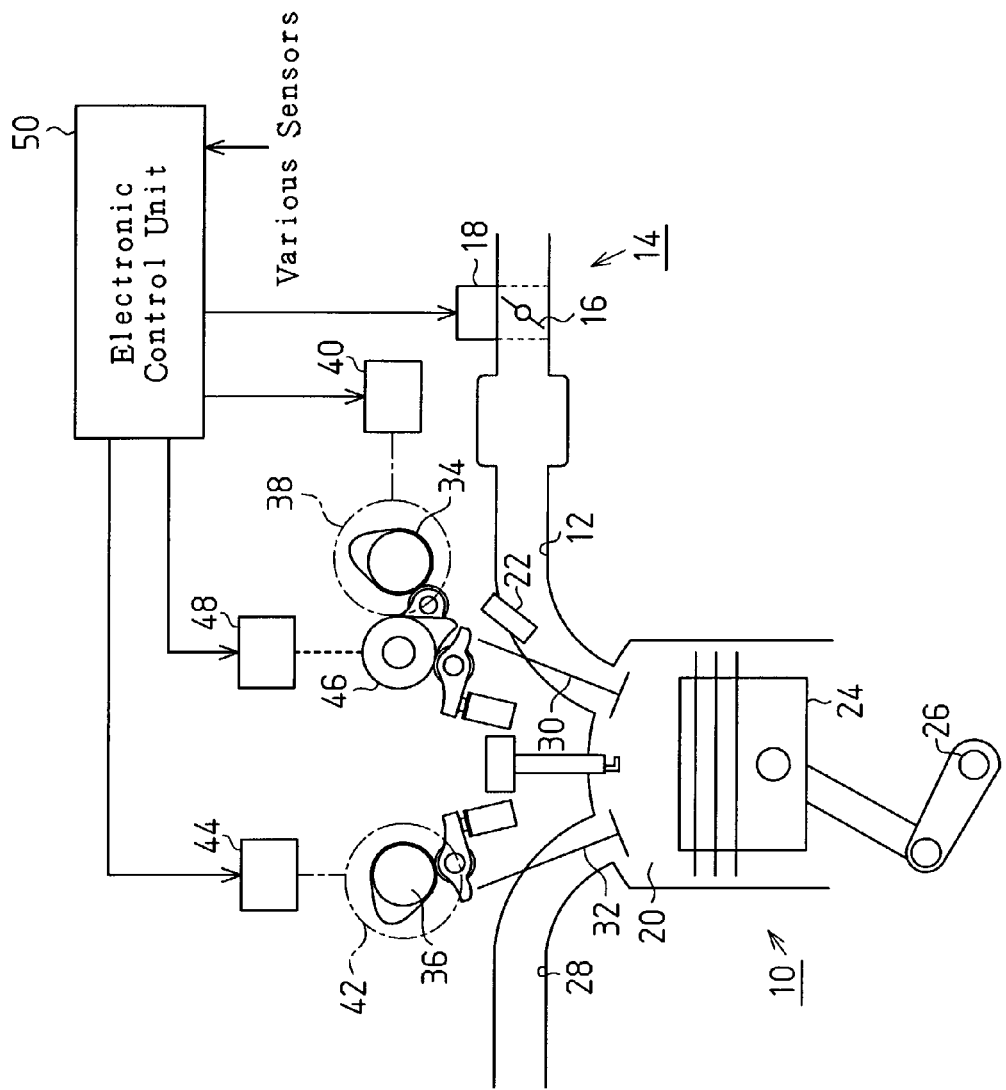
FIG. 1 is a schematic structural diagram illustrating an internal combustion engine to which one embodiment of the present invention is applied.

FIG. 1 shows a schematic structure of an internal combustion engine 10 to which a control method according to the preferred embodiment is applied.

The engine 10 has cylinders and combustion chambers 20 (only one is shown). Each combustion chamber 20 is defined in one of the cylinders. The engine 10 also has injectors 22, ignition plugs, intake valves 30, pistons 24, and exhaust valves 32, each corresponding to one of the combustion chambers 20. In the following, only one set of a combustion chamber 20, an injection valve, an ignition plug, an intake valve 30, a piston 24, and an exhaust valve 32 will mainly be discussed as representing all the combustion chambers 20, the injection valves, the ignition plugs, the intake valves 30, and the exhaust valves 32.

As shown in FIG. 1, the internal combustion engine 10 includes an intake passage 12, which is provided with a throttle mechanism 14. The throttle mechanism 14 includes a throttle valve 16 and a throttle motor 18. The throttle motor 18 controls the opening degree (throttle opening degree TA) of the throttle valve 16, thereby adjusting the amount of air drawn into the combustion chamber 20 through the intake passage 12. The intake passage 12 is provided with the injector 22. The injector 22 injects fuel into the intake passage 12.

In the combustion chamber 20 of the internal combustion engine 10, an air-fuel mixture consisting of intake air and injected fuel is ignited and burned. The combustion causes the piston 24 to reciprocate, causing a crankshaft 26 to rotate. After the combustion, the air-fuel mixture is discharged to an exhaust passage 28 from the combustion chamber 20 as exhaust.

In the internal combustion engine 10, the intake passage 12 and the combustion chamber 20 are selectively connected and disconnected by opening or closing the intake valve 30, while the combustion chamber 20 and the exhaust passage 28 are selectively connected and disconnected by opening or closing the exhaust valve 32. Also, the intake valve 30 is selectively opened and closed in accordance with rotation of an intake camshaft 34 to which the rotation of the crankshaft 26 is transmitted, while the exhaust valve 32 is selectively opened and closed in accordance with rotation of an exhaust camshaft 36 to which the rotation of the crankshaft 26 is transmitted.

Figure 2:
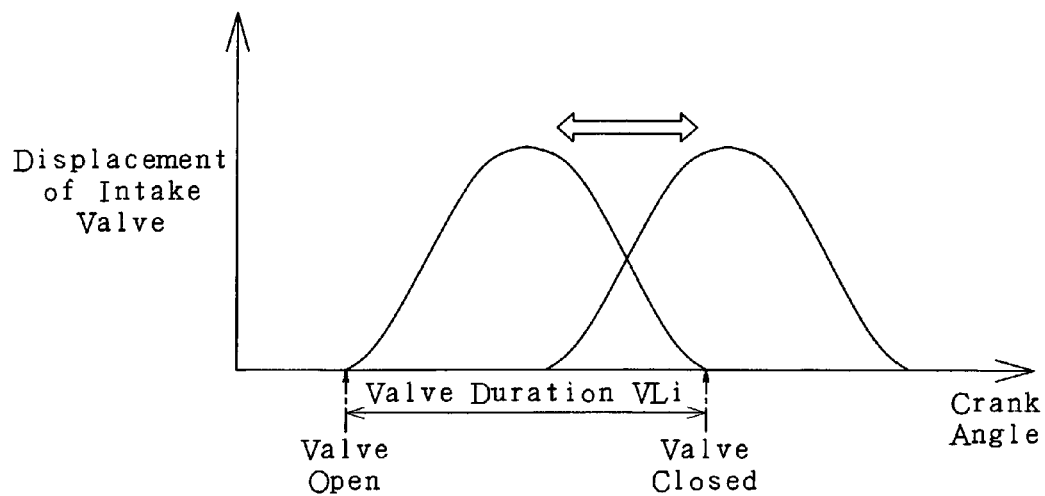
FIG. 2 is a graph showing the variation of the valve timing of an intake valve based on actuation of an intake variable valve timing mechanism.

The intake camshaft 34 is provided with an intake variable valve timing mechanism 38. The intake variable valve timing mechanism 38 adjusts the relative rotational angle of the intake camshaft 34 with respect to the rotational angle (crank angle) of the crankshaft 26 to advance or retard the valve timing VTi of the intake valve 30. The intake variable valve timing mechanism 38 is actuated by controlling, for example, the oil pressure applied to the mechanism 38 through an actuator 40 such as a hydraulic control valve. FIG. 2 shows the variation of the valve timing of the intake valve 30 based on the actuation of the intake variable valve timing mechanism 38. As apparent from FIG. 2, when changing the valve timing VTi, the valve opening timing and valve closing timing of the intake valve 30 are advanced or retarded while preserving the valve duration VLi of the intake valve 30 (the crank angle from when the intake valve 30 is opened until when the intake valve 30 is closed) at a certain value. In other words, the valve duration VLi of the intake valve 30 corresponds with the length of time, measured in degrees of crankshaft rotation, that the intake valve 30 remains open.

The exhaust camshaft 36 is provided with an exhaust variable valve timing mechanism 42. The exhaust variable valve timing mechanism 42 adjusts the relative rotational angle of the exhaust camshaft 36 with respect to the crank angle to advance or retard the valve timing VTe of the exhaust valve 32. The exhaust variable valve timing mechanism 42 is actuated by controlling, for example, the oil pressure applied to the mechanism 42 through an actuator 44 such as a hydraulic control valve. Also, when changing the valve timing VTe of the exhaust valve 32 by actuating the exhaust variable valve timing mechanism 42, similarly to the above mentioned variation manner of the intake valve 30, the valve opening timing and the valve closing timing of the exhaust valve 32 are advanced or retarded while preserving the valve duration VLi of the exhaust valve 32 at a certain value.

Figure 3:
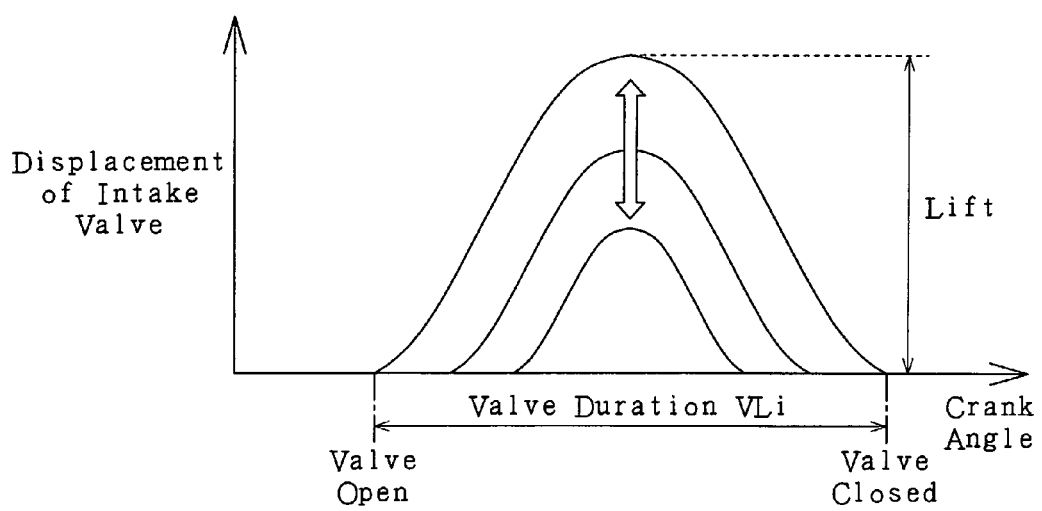
FIG. 3 is a graph showing the variation of the valve duration of the intake valve based on actuation of an operation angle variable mechanism.

An variable valve duration mechanism 46 is provided between the intake camshaft 34 and the intake valve 30. The variable valve duration mechanism 46 variably sets the valve duration VLi of the intake valve 30 in accordance with the engine operating state, and is actuated by controlling an actuator 48 such as an electric motor. The variation of the valve duration VLi of intake valve 30 based on the actuation of the variable valve duration mechanism 46 is shown in FIG. 3. As apparent from FIG. 3, by the actuation of the variable valve duration mechanism 46, the valve duration VLi of the intake valve 30 changes in synchronization with the lift. For example, as the valve duration VLi is decreased, the lift is also decreased. When the valve duration VLi is increased, the time lag between the valve opening timing and the valve closing timing of the intake valve 30 is increased, that is the valve opening period of the intake valve 30 is increased.

The internal combustion engine 10 includes an electronic control unit 50, which is composed of, for example, a microcomputer. The electronic control unit 50, which functions as a first control unit, a second control unit, and a third control unit, receives detection signals from various types of sensors for detecting the operating state of the internal combustion engine 10. The various types of sensors include, for example, a crank sensor for detecting the rotation speed (engine rotation speed) of the crankshaft 26, a gas pedal sensor for detecting the depression amount of a gas pedal (not shown), and an intake air amount sensor for detecting the amount of intake air flowing through the intake passage 12. Furthermore, the various types of sensors include a position sensor for detecting the valve timing VTi of the intake valve 30, a position sensor for detecting the valve timing VTe of the exhaust valve 32, and an valve duration sensor for detecting the valve duration of the intake valve 30 set by the variable valve duration mechanism 46.

The electronic control unit 50 performs various types of computations based on detection signals from the various types of sensors, and based on the computation results, executes engine control such as actuation of the intake variable valve timing mechanism 38, the exhaust variable valve timing mechanism 42, and the variable valve duration mechanism 46.

In the internal combustion engine 10, as the throttle opening degree TA is increased and the valve duration VLi of the intake valve 30 is increased, the intake air amount is increased. Therefore, in the engine control of the preferred embodiment, the actuation of the throttle mechanism and the variable valve duration mechanism 46 are basically controlled such that the throttle opening degree TA is increased and the valve duration VLi of the intake valve 30 is increased in a high-load zone in which the target intake air amount is large.

Figure 4:
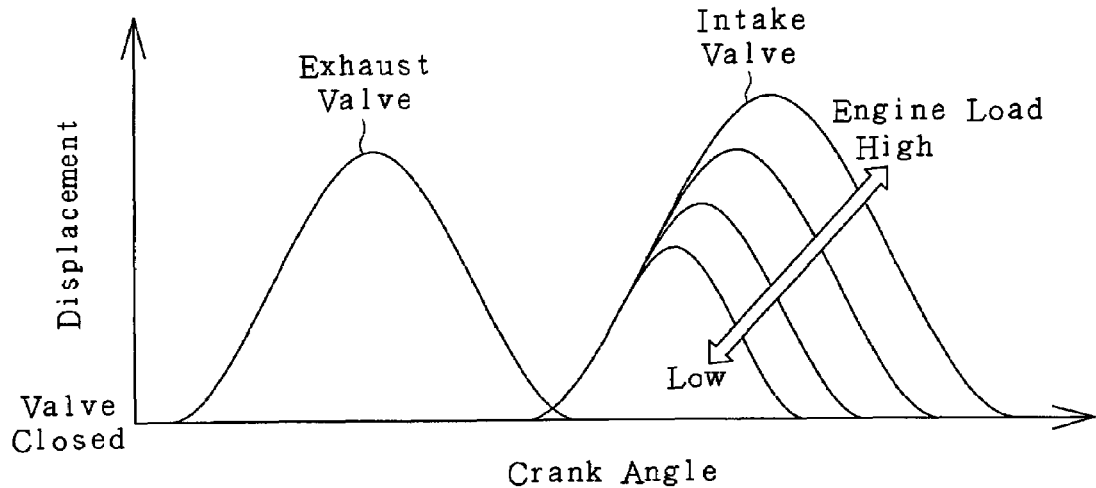
FIG. 4 is a graph showing one example of the displacement of the intake valve and an exhaust valve.

Moreover, as FIG. 4 shows one example of the variation of the intake valve 30 and the exhaust valve 32, in the engine control of the preferred embodiment, the actuation of the intake variable valve timing mechanism 38 and the variable valve duration mechanism 46 are controlled such that the valve timing VTi of the intake valve 30 is advanced in a low-load zone in which the valve duration VLi of the intake valve 30 is small. The reason for this is as follows.

If only the valve duration VLi of the intake valve 30 is decreased without changing the valve timing VTi of the intake valve 30, the valve opening timing of the intake valve 30 is undesirably retarded (see FIG. 3). Furthermore, when the valve opening timing of the intake valve 30 is on the angle delaying side with respect to the top dead center, the piston 24 moves down with the intake valve 30 and the exhaust valve 32 being closed during a period from when the piston 24 has passed the top dead center until the intake valve 30 is opened. This causes losses. Therefore, in the engine control, the smaller the valve duration VLi of the intake valve 30 is, the more the valve timing VTi is retarded so that the valve opening timing of the intake valve 30 is set to suppress occurrence or increase of such losses as much as possible.

Figure 5:
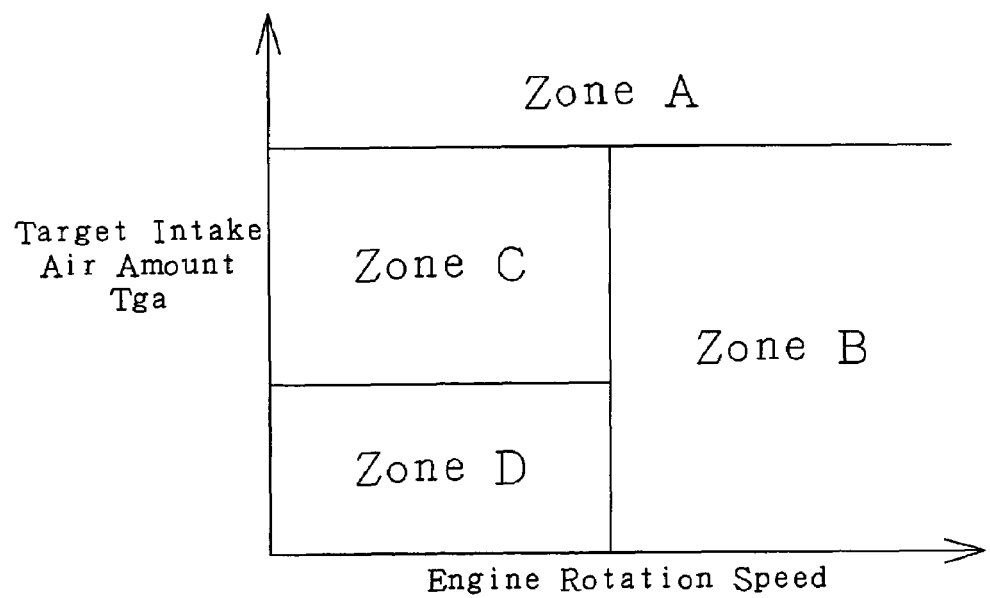
FIG. 5 is a schematic diagram illustrating operating zones of the internal combustion engine.

In the preferred embodiment, engine operating zones are defined. The actuation of the throttle mechanism 14, the intake variable valve timing mechanism 38, the exhaust variable valve timing mechanism 42, and the variable valve duration mechanism 46 are controlled differently depending on the zones. As shown in FIG. 5, four zones including a zone A, which is a high-load zone, a zone B, which is a high-speed and low-load zone, a zone C, which is a low-speed and low-load zone, and a zone D, which is a lower-load region of the low-speed and low-load zone are defined as the engine operating zones. The zones A, B, C, and D are defined in accordance with the engine rotation speed and the target intake air amount Tga, which will be described below.

The procedure for controlling the actuation of the mechanisms 14, 38, 42, 46 will be described below with reference to a flowchart of FIG. 6.

Figure 6:
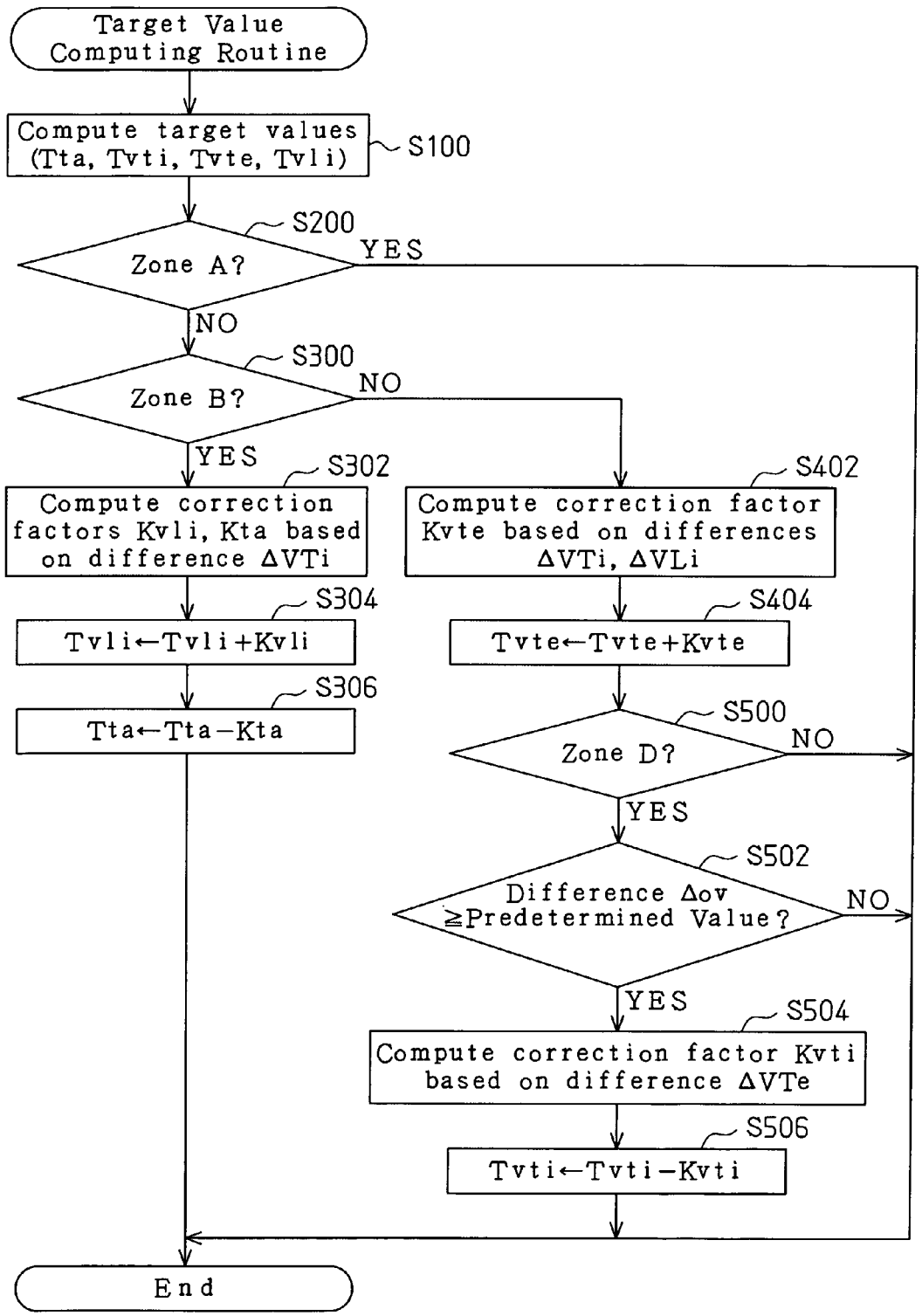
FIG. 6 is a flowchart showing a specific procedure of a target value computing routine.
Figure 7A:
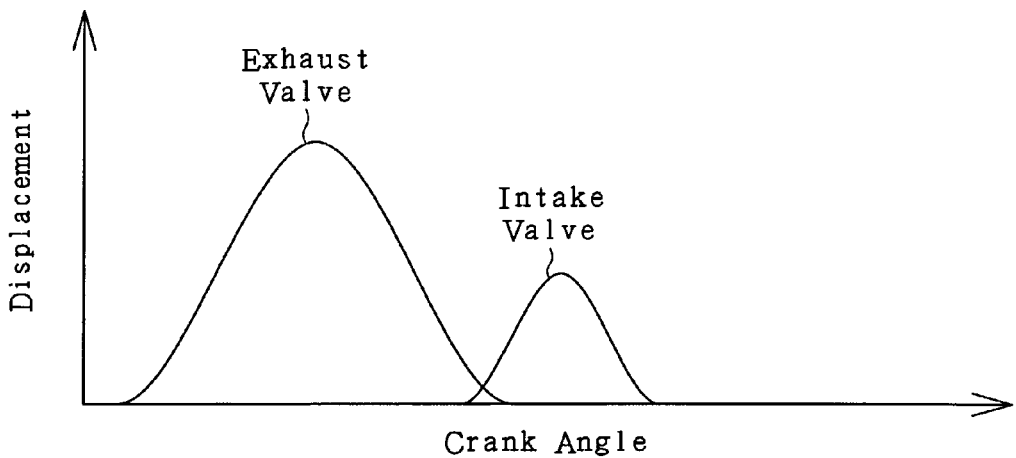
FIGS. 7A to 7C are graphs showing one example of the displacement of the intake valve and the exhaust valve according to a conventional control method.
Figure 7B:
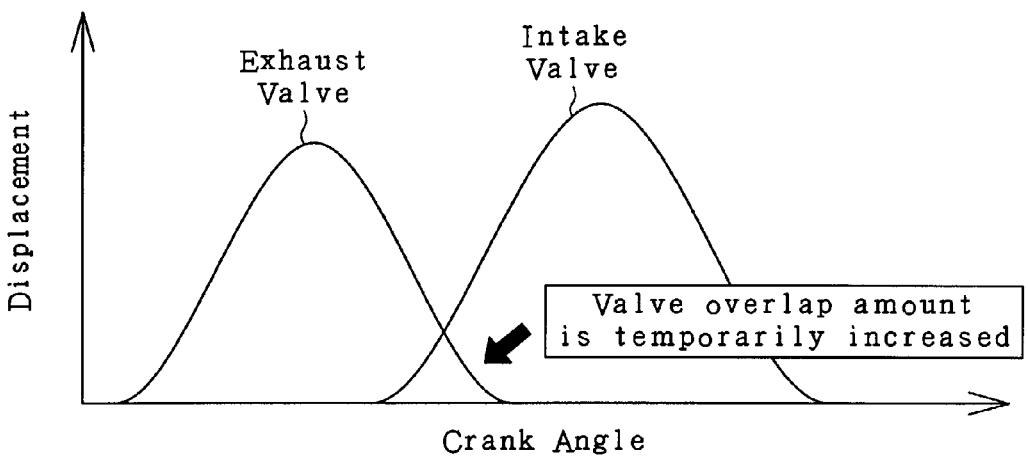
Figure 7C:
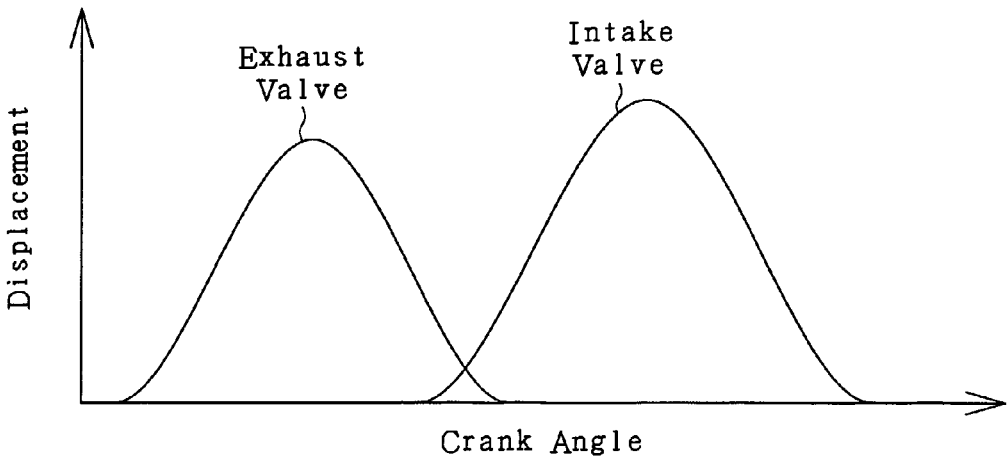

A series of processes shown in the flowchart of FIG. 6 represents a specific procedure for computing the target values of the throttle opening degree TA, the valve timings VTi, VTe, and the valve duration VLi, and is executed by the electronic control unit 50 at predetermined intervals.

First, a procedure for controlling the actuation in the zone A will be described blow.

When the engine load is high, the flow rate of the intake air is high, and exhaust remaining in the combustion chamber 20 and the exhaust passage 28 during the exhaust stroke is not easily returned to the intake passage 12, that is, an internal EGR does not easily occur. Therefore, even if the valve overlap amount of the intake valve 30 and the exhaust valve 32 is changed, the exhaust characteristics and the fuel efficiency do not change significantly. Therefore, in this case, it is preferable to coincide the valve timings VTi, VTe and the valve duration VLi with their target values rather than accurately controlling the valve overlap amount to coincide its target value in view of improving the engine output.

In this respect, a control (absolute value control) for coinciding the valve timings VTi, VTe and the valve duration VLi with their target values is executed in the zone A, which is the high-load zone.

A specific procedure for computing the target values in the zone A will be described below.

As shown in FIG. 6, the target value of the intake air amount (the target intake air amount Tga) is first computed based on the depression amount of the gas pedal and the engine rotation speed. Then, based on the target intake air amount Tga, the target values of the throttle opening degree TA, the valve timings VTi, VTe, and the valve duration VLi (the target throttle opening degree Tta, the target valve timings Tvti, Tvte, the target valve duration Tvli) are computed (step S100). In the process of step S100, values that permit the internal combustion engine 10 to be appropriately operated when the operating state of the internal combustion engine 10 hardly changes (when the engine 10 is in a steady operating state) are computed as the target values.

At this time, since the engine operating zone determined by the target intake air amount Tga and the engine rotation speed is the zone A (YES at step S200), the electronic control unit 50 ends the current routine.

Therefore, in the zone A, the actuation of the mechanisms 14, 38, 42, 46 is controlled in accordance with the target values computed in step 100, which in turn control the throttle opening degree TA, the valve timings VTi, VTe, and the valve duration VLi. Therefore, when the internal combustion engine 10 comes into a transition operating state, the divergence between the throttle opening degree TA, the valve timings VTi, VTe, and the valve duration VLi and their target values (the target throttle opening degree Tta, the target valve timings Tvti, Tvte, and the target valve duration Tvli) is promptly eliminated, thus improving the engine output.

Next, the procedure for controlling the actuation in the zone B will be described.

When the engine load is high, the target valve timing Tvti and the target valve timing Tvte are set such that the charging efficiency is increased to secure the engine output. Also, the valve duration VLi of the intake valve 30 is set to a relatively great value to supply as much intake air as possible to the combustion chamber 20.

In this state, when the engine 10 shifts from a high-load state to a deceleration state, the target valve timing Tvti is gradually advanced, and the valve duration VLi of the intake valve 30 is decreased. The operating zone of the internal combustion engine 10 is in the zone B when the engine 10 shifts from the high-load state to the deceleration state.

At this time, when changing the valve timing VTi is delayed and the valve duration VLi of the intake valve 30 is decreased before changing the valve timing VTi, the valve overlap amount is decreased more than necessary. This causes significant negative pressure in the combustion chamber 20. As a result, part of lubricant outside the combustion chamber 20 enters the combustion chamber 20 by the negative pressure, leading to increase in the consumption of the lubricant and dilution of the lubricant by fuel. Furthermore, at this time, since the valve opening timing of the intake valve 30 is delayed by an amount corresponding to the delay of changing the valve timing VTi, the flow rate of intake air flowing into the combustion chamber 20 is increased, causing the intake temperature in the combustion chamber 20 to be increased. This may induce knocking.

In this respect, in the zone B, the rate of changing the valve duration VLi of the intake valve 30 to be decreased is set lower than that in the normal state (more specifically, when executing the absolute value control). This suppresses the valve overlap amount from being decreased more than necessary and the valve opening timing of the intake valve 30 from being delayed more than that in the normal state, thus suppressing increase of consumption and dilution of the lubricant, or occurrence of knocking.

When the rate of changing the valve duration VLi of the intake valve 30 is decreased, adverse effects such as those caused by the occurrence of the negative pressure are suppressed. However, meanwhile, since the valve duration VLi is preserved to a great value longer than in the normal state, the pumping loss is decreased by a corresponding amount and sufficient feeling of deceleration may not be obtained. Therefore, in the preferred embodiment, when decreasing the rate of changing the valve duration VLi, the throttle opening degree TA is decreased simultaneously. This increases the pumping loss, and secures the feeling of deceleration. Also, the rate of decreasing the intake air amount may be slowed down by an amount corresponding to the amount the valve duration VLi of the intake valve 30 becomes greater than that in the normal state. However, the rate of decreasing the intake air amount is suppressed from being slowed down by decreasing the throttle opening degree TA.

The specific procedure for computing the target values in the zone B will be described below.

As shown in FIG. 6, in the procedure for computing the target values, the target throttle opening degree Tta, the target valve timings Tvti, Tvte, and the target valve duration Tvli are first computed (step S100).

Thereafter, in the zone B (NO at step 200, YES at S300), the correction factor Kvli of the target valve duration Tvli and the correction factor Kta of the target throttle opening degree Tta are computed (step S302) by a map computation based on the difference ΔVTi between the target valve timing Tvti and the valve timing VTi.

As the valve timing VTi is delayed with respect to the target valve timing Tvti, a greater value, in other words, a value that increases the target valve duration Tvli and decreases the rate of changing the valve duration VLi is computed as the correction factor Kvli. The computation map for the correction factor Kvli represents the relationship between the correction factor Kvli and the difference ΔVTi that optimizes the valve overlap amount. The relationship is obtained from experimental results. Also, as the valve timing VTi is delayed with respect to the target valve timing Tvti, a greater value, in other words, a value that decreases target throttle opening degree Tta is computed as the correction factor Kta. The computation map for the correction factor Kta represents the relationship between the correction factor Kta and the difference ΔVTi that permits sufficient feeling of deceleration to be obtained. The relationship is obtained from experimental results.

Then, a value obtained by adding the correction factor Kvli to the target valve duration Tvli is set as a new target valve duration Tvli (step S304), and a value obtained by subtracting the correction factor Kta from the target throttle opening degree Tta is set as a new target throttle opening degree Tta (step S306). Thereafter, the electronic control unit 50 ends the current routine.

Next, the procedure for controlling the actuation in the zone C, that is a first low-load zone, will be described.

When the engine is in the operating zone where the engine load is relatively low, the internal EGR easily occurs since the flow rate of intake air is low. Appropriately controlling the amount of the internal EGR purifies exhaust and improves the fuel efficiency.

Therefore, in the zone C where the engine load is relatively low, the internal EGR amount is adjusted by executing a control (relative value control) for coinciding the valve overlap amount with its target value.

The valve overlap amount is adjustable by changing at least one of the valve timing VTi and the valve duration VLi of the intake valve 30, and the valve timing VTe of the exhaust valve 32. However, although the intake air amount is hardly changed by changing the valve timing VTe of the exhaust valve 32, the intake air amount is undesirably changed by changing the valve timing VTi or the valve duration VLi of the intake valve 30. Therefore, in the zone C, the valve overlap amount is adjusted by changing the valve timing VTe of the exhaust valve 32 that does not change the intake air amount.

The specific procedure for computing the target values in the zone C will be described.

As shown in FIG. 6, in the procedure for computing the target values, the target throttle opening degree Tta, the target valve timings Tvti, Tvte, and the target valve duration Tvli are first computed (step S100).

Thereafter, in the zone C (NO at step S200, NO at S300), the correction factor Kvte of the target valve timing Tvte is computed (step S402) by a map computation based on the difference ΔVTi between the target valve timing Tvti and the valve timing VTi, and the difference ΔVLi between the target valve duration Tvli and the valve duration VLi.

The smaller the valve duration VLi is with respect to the target valve duration Tvli, and the more the valve timing VTi is delayed with respect to the target valve timing Tvti, a greater value, in other words, a value that delays the valve timing VTe of the exhaust valve 32 is computed as the correction factor Kvte. The computation map for the correction factor Kvte represents the relationship between the correction factor Kvte and the differences ΔVTi, ΔVLi that adjusts the valve overlap amount to an appropriate amount. The relationship is obtained from experimental results. The term "appropriate amount" refers to the valve overlap amount (target valve overlap amount) determined based on the target values (the target valve timings Tvti, Tvte and the target valve duration Tvli) obtained in step S100.

Then, a value obtained by adding the correction factor Kvte to the target valve timing Tvte is set as a new target valve timing Tvte (step S404). After that, since the engine operating zone is in the zone C (NO at step S500), the electronic control unit 50 ends the current routine.

As described above, in the zone C, the relative value control is executed. In the relative value control, as compared to a case where the absolute value control is executed, the divergence between the valve timings VTi, VTe and the valve duration VLi and their target values Tvti, Tvte, Tvli may be significant. However, sine the valve overlap amount and the internal EGR amount are appropriately controlled, the exhaust is purified and the fuel efficiency is improved.

Next, the procedure for controlling the actuation in the zone D, that is a second low-load zone, will be described.

In the zone D, a control that is basically identical to the relative value control executed in the zone C is executed. That is, the valve timing VTe of the exhaust valve 32 is changed in accordance with the differences ΔVTi, ΔVLi to coincide the actual valve overlap amount with the target valve overlap amount.

However, in the relative value control executed in the zone D, if there is a divergence that is greater than a predetermined amount between the target valve overlap amount and the actual valve overlap amount, the valve duration VLi of the intake valve 30 is changed in addition to changing the valve timing VTe.

The valve duration VLi of the intake valve 30 is changed for the following reasons.

The intake air amount that passes through the throttle valve 16 basically increases as the difference between the pressure at a section that is upstream of the throttle valve 16 and the pressure at a section that is downstream of the throttle valve 16 increases. However, when the pressure at the section that is downstream of the throttle valve 16 is decreased under a certain condition of the throttle opening degree TA, if the pressure ratio of the upstream section to the downstream section (downstream pressure/upstream pressure) becomes less than the critical pressure ratio, the intake air amount that passes through the throttle valve 16 stops increasing. The critical pressure ratio is the pressure ratio where the flow rate of the intake air that passes through the throttle valve 16 reaches the sound speed.

The circumstance where the pressure ratio becomes less than the critical pressure ratio is likely to occur when the throttle opening degree TA is small. In the preferred embodiment, such a circumstance occurs in the zone D, which is a zone where the engine load is particularly low in the low-load zone (low-load region). Therefore, in the zone D, unlike the zone C, the intake air amount hardly changes even if the valve duration VLi of the intake valve 30 is changed. Therefore, the valve duration VLi of the intake valve 30 is not adjusted for the purpose of changing the intake air amount, and even if the valve duration VLi is changed, the engine rotation speed is not changed.

Also, since the zone D is the operating zone in which the engine load is low, the combustion state easily becomes unstable when the internal EGR amount is increased. Therefore, unnecessary increase in the valve overlap amount is preferably avoided as much as possible.

Taking into consideration of such an actual condition, in the zone D, the valve duration VLi of the intake valve 30 is changed in addition to changing the valve timing VTe of the exhaust valve 32 as the relative value control. Accordingly, in a case where the valve overlap amount is unnecessarily increased although the valve timing VTe of the exhaust valve 32 is changed in accordance with the differences ΔVTi, ΔVLi, the valve overlap amount is promptly decreased.

A specific procedure for computing the target values in the zone D will be described.

As shown in FIG. 6, in the procedure for computing the target values, the target throttle opening degree Tta, the target valve timings Tvti, Tvte, and the target valve duration Tvli are first computed (step S100). Thereafter, since the engine operating state is in the zone D (NO at step S200, No at S300), the correction factor Kvte of the target valve timing Tvte is computed (step S402), and a value obtained by adding the correction factor Kvte to the target valve timing Tvte is set as a new target valve timing Tvte (step S404).

In the zone D (YES at step S500), on condition that the difference Δov between the target valve overlap amount and the actual valve overlap amount is greater than or equal to a predetermined value (YES at step S502), the valve duration VLi of the intake valve 30 is changed (changing process). The actual valve overlap amount is obtained from the valve timings VTi, VTe and the valve duration VLi at each occasion. The predetermined value is a value that accurately determines the possibility of the combustion state becoming unstable through comparison with the difference Δov, and is set based on experimental results.

In the changing process, more specifically, the correction factor Kvli is computed by a map computation based on the difference ΔVTe between the target valve timing Tvte and the valve timing VTe (step S504), and a value obtained by subtracting the correction factor Kvli from the target valve duration Tvli is set as a new target valve duration Tvli (step S506). As the valve timing VTe is delayed with respect to the target valve timing Tvte, a greater value, in other words, a value that decreases the valve duration VLi of the intake valve 30 is computed as the correction factor Kvli. The computation map for the correction factor Kvli represents the relationship between the correction factor Kvli and the difference ΔVTe that coincides the valve overlap amount with the target valve overlap amount. The relationship is obtained from experimental results.

As described above, in the relative value control of the zone D, the valve duration VLi of the intake valve 30 is simultaneously changed. Therefore, as compared to the zone C in which the valve duration VLi of the intake valve 30 is not changed, the divergence between the target valve overlap amount and the actual valve overlap amount is promptly eliminated, thus suppressing the engine operating state from being unstable due to the increase of the internal EGR amount as much as possible.

As described above, the preferred embodiment has the following advantages.

(1) When the engine load is in the low-load zone, the relative value control is executed. Therefore, the divergence between the valve overlap amount and the target valve overlap amount is decreased and the internal EGR amount is appropriately controlled. This purifies the exhaust, improves the fuel efficiency, and further improves the combustion stability during idling. Furthermore, when the engine load is in the high-load zone, the absolute value control is executed. Therefore, the divergence between the valve timings VTi, VTe and the valve duration VLi and their target values (Tvti, Tvte, Tvli) is reliably decreased. This improves the engine output in a suitable manner.

(2) When the internal combustion engine 10 shifts from the high-load state to the deceleration state, the rate of changing the valve duration VLi of the intake valve 30 to be decreased is lowered as compared to the normal state. Therefore, the valve overlap amount is suppressed from unnecessarily decreased, and increase of the consumption and dilution of the lubricant are suppressed.

(3) When decreasing the rate of changing the valve duration VLi, the throttle opening degree TA is simultaneously decreased. This secures the feeling of deceleration.

(4) When the engine load is in the low-load region of the low-load zone, and the difference Δov between the valve overlap amount and the target valve overlap amount is greater than or equal to the predetermined value, the relative value control is executed in which the valve duration VLi of the intake valve 30 is changed in addition to changing the valve timing VTe of the exhaust valve 32. Therefore, the engine combustion state is suppressed from becoming unstable due to the increase of the internal EGR caused by excessive increase of the valve overlap amount in the low-load region.

The preferred embodiment may be modified as follows.

In the zone B, the process for decreasing the throttle opening degree TA, more specifically the process for computing the correction factor Kta based on the difference ΔVTi (part of step S302) and the process for correcting the target throttle opening degree Tta based on the correction factor Kta (step S306) may be omitted.

Also, in the zone B, the process for decreasing the rate of changing the valve duration VLi of the intake valve 30 than that in the normal state, more specifically the process for computing the correction factor Kvli based on the difference ΔVTi (part of step S302) and the process for correcting the target valve duration Tvli based on the correction factor Kvli (step S304) may be omitted. In this case, the engine operating zone is first divided into three zones: a high-load zone; a low-load zone; and a low-load region of the low load zone. The zones are defined in accordance with the target intake air amount Tga instead of the engine rotation speed. Then, the actuation control of the mechanisms 14, 38, 42, 46 is executed in the same manner as the zone A in the high-load zone, in the same manner as the zone C in the low-load zone, and in the same manner as the zone D in the low-load region of the low-load zone.

The relative value control in the zone C may be changed as required as long as the change of the intake air amount and the adverse effect caused by the change of the intake air amount are appropriately suppressed. For example, control methods may be employed in which the valve timing VTi or the valve duration VLi is changed instead of changing the valve timing VTe, or two of the valve timings VTi, VTe and the valve duration VLi are changed.

In the zone D, the procedure for changing the valve duration VLi (steps S502 to S506) may be omitted. In this case, in the zones C and D, the actuation control of the mechanisms 14, 38, 42, 46 may be executed in the same manner as in the zone C.

The invention claimed is:

1. A control method for an internal combustion engine that controls a valve timings and lifts of an intake valve and an exhaust valve and a valve duration of the intake valve based on an operating state of the internal combustion engine, the method comprising:

executing an absolute value control, wherein, when an engine load is in a high-load zone, the actual values of the valve timings and lifts of the intake valve and the exhaust valve and the valve duration of the intake valve are controlled to coincide with respective target values set based on the operating state of the internal combustion engine; and executing a relative value control, wherein, when the engine load is in a low-load zone, the actual value of a valve overlap amount of the intake valve and the exhaust valve is controlled to coincide with a target valve overlap amount obtained based on the target values, target values being computed as values that permit the internal combustion engine to be appropriately operating when the internal combustion engine is in a steady operating state, decreasing a rate of changing the valve duration of the intake valve when decreasing the valve duration of the intake valve as compared to the rate of changing the valve duration of the intake valve when executing the absolute value control, when the internal combustion engine shifts from a state where the absolute value control is executed to a deceleration state, in which the valve duration and the lift of the intake valve are allowed to be decreasing.

2. The method according to claim 1, wherein the state in which the valve duration and the lift of the intake valve are allowed to be decreasing is a high-speed and low-load zone, wherein a target intake air amount is defined as the target value of an intake air amount to the engine, wherein an engine rotation speed in the high-speed and low-load zone is higher than the engine rotation speed in the low-load zone, wherein the target intake air amount in the high-load zone is higher than the target intake air amount of the high-speed and low-load zone, wherein the target intake air amount in the high-load zone is higher than the target intake air amount in the low-load zone.

3. The method according to claim 2, wherein the internal combustion engine includes an intake passage provided with an intake throttle valve, the method further comprising:

decreasing the opening degree of the intake throttle valve when decreasing the rate of changing the valve duration of the intake valve.

4. The method according to claim 1, further comprising:

controlling the valve timing of the intake valve and the valve duration of the intake valve to coincide with respective target values when executing the relative value control; and controlling the valve timing of the exhaust valve based on the control state of the valve timing of the intake valve and the valve duration of the intake valve to coincide the actual value of the valve overlap amount with the target valve overlap amount.

5. The method according to claim 4, wherein the low-load zone is a first low-load zone, the method further comprising:

controlling the valve duration of the intake valve based on the actual valve timing of the exhaust valve to coincide the actual value of the valve overlap amount with the target valve overlap amount when the engine load is in a second low-load zone in which the engine load is lower than that in the first low-load zone and the difference between the actual value of the valve overlap amount and the target valve overlap amount is greater than or equal to a predetermined value.

6. The method according to claim 5, wherein the second low-load zone is a zone of the engine load where the intake air amount hardly changes by changing the valve duration of the intake valve.

7. The method according to claim 2, further comprising:

controlling the valve timing of the intake valve and the valve duration of the intake valve to coincide with respective target values when executing the relative value control; and controlling the valve timing of the exhaust valve based on the control state of the valve timing of the intake valve and the valve duration of the intake valve to coincide the actual value of the valve overlap amount with the target valve overlap amount.

8. The method according to claim 3, further comprising:

controlling the valve timing of the intake valve and the valve duration of the intake valve to coincide with respective target values when executing the relative value control; and controlling the valve timing of the exhaust valve based on the control state of the valve timing of the intake valve and the valve duration of the intake valve to coincide the actual value of the valve overlap amount with the target valve overlap amount.

9. A control apparatus for an internal combustion engine that controls a valve timings and lifts of an intake valve and an exhaust valve and a valve duration of the intake valve based on an operating state of the internal combustion engine, the apparatus comprising:
- a first control unit, which executes an absolute value control, wherein, when an engine load is in a high-load zone, the actual values of the valve timings and lifts of the intake valve and the exhaust valve and the valve duration of the intake valve are controlled to coincide with respective target values set based on the operating state of the internal combustion engine; and
- a second control unit, which executes a relative value control, wherein, when the engine load is in a low-load zone, the actual value of a valve overlap amount of the intake valve and the exhaust valve is controlled to coincide with a target valve overlap amount obtained based on the target values, the second control unit computing target values as values that permit the internal combustion engine to be appropriately operating when the engine is in a steady operating state,
- a third control unit, which decreases a rate of changing the valve duration of the intake valve when decreasing the valve duration of the intake valve as compared to the rate of changing the valve duration of the intake valve when executing the absolute value control, when the internal combustion engine shifts from a state where the absolute value control is executed to a state, in which the valve duration and the lift of the intake valve are allowed to be decreasing.

10. The apparatus according to claim 9, wherein the state in which the valve duration and the lift of the intake valve are allowed to be decreasing is a high-speed and low-load zone,
- wherein a target intake air amount is defined as the target value of an intake air amount to the engine,
- wherein an engine rotation speed in the high-speed and low-load zone is higher than the engine rotation speed in the low-load zone,
- wherein the target intake air amount in the high-load zone is higher than the target intake air amount of the high-speed and low-load zone,
- wherein the target intake air amount in the high-load zone is higher than the target intake air amount in the low-load zone.

11. The apparatus according to claim 10, wherein the internal combustion engine includes an intake passage provided with an intake throttle valve,
- wherein, when decreasing the rate of changing the valve duration of the intake valve, the third control unit decreases the opening degree of the intake throttle valve.

12. The apparatus according to claim 9,
- wherein the second control unit controls the valve timing of the intake valve and the valve duration of the intake valve to coincide with respective target values; and
- wherein the second control unit controls the valve timing of the exhaust valve based on the control state of the valve timing of the intake valve and the valve duration of the intake valve to coincide the actual value of the valve overlap amount with the target valve overlap amount.

13. The apparatus according to claim 10,
- wherein the second control unit controls the valve timing of the intake valve and the valve duration of the intake valve to coincide with respective target values; and
- wherein the second control unit controls the valve timing of the exhaust valve based on the control state of the valve timing of the intake valve and the valve duration of the intake valve to coincide the actual value of the valve overlap amount with the target valve overlap amount.

14. The apparatus according to claim 11,
- wherein the second control unit controls the valve timing of the intake valve and the valve duration of the intake valve to coincide with respective target values; and
- wherein the second control unit controls the valve timing of the exhaust valve based on the control state of the valve timing of the intake valve and the valve duration of the intake valve to coincide the actual value of the valve overlap amount with the target valve overlap amount.

* * * * *